Dec. 22, 1970     A. E. PHILLIPS     3,548,678
TORQUE ABSORBER FOR SHAFT MOUNTED GEAR DRIVES
Filed May 14, 1969                     2 Sheets-Sheet 1
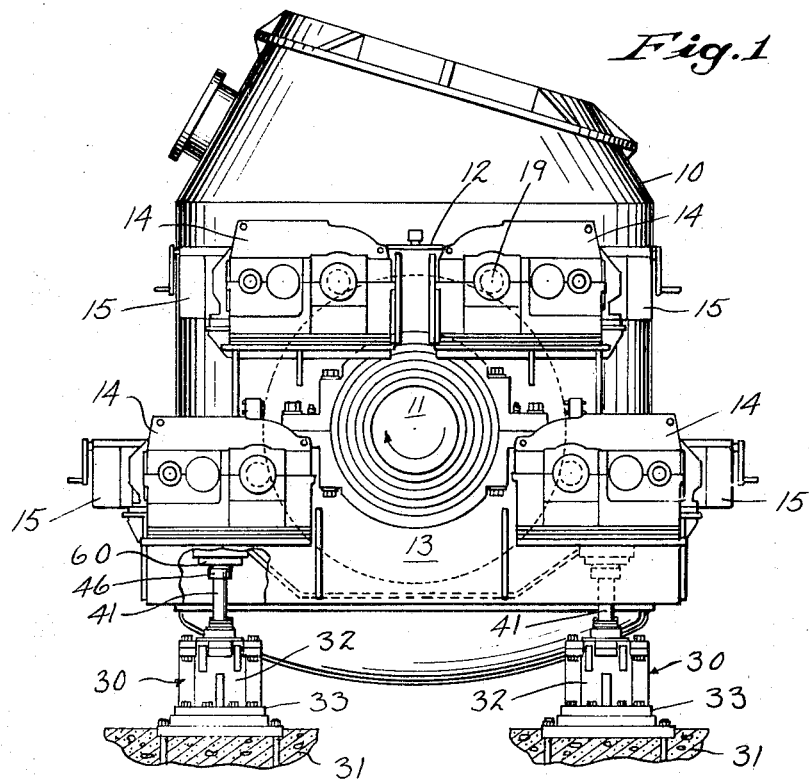
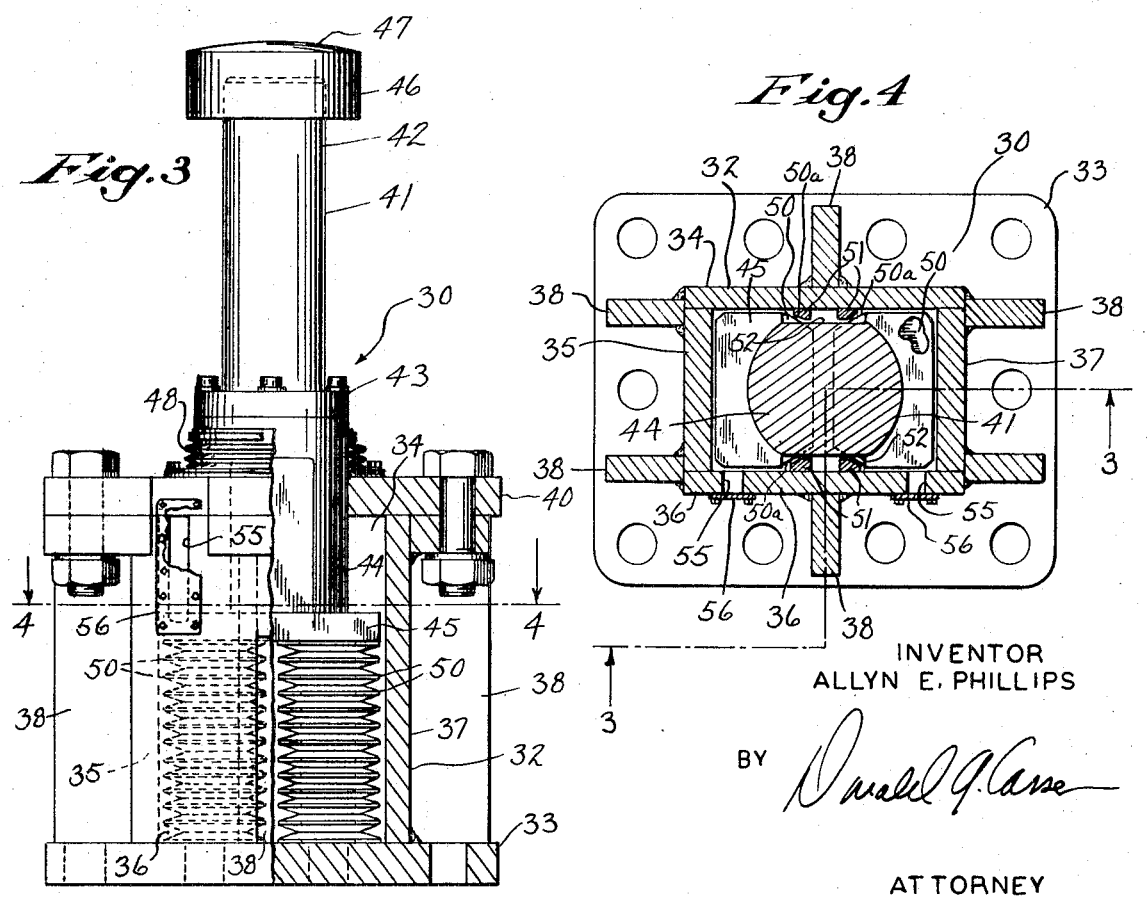
INVENTOR
ALLYN E. PHILLIPS
BY  *Donald J. Casse*
ATTORNEY Dec. 22, 1970  A. E. PHILLIPS  3,548,678
TORQUE ABSORBER FOR SHAFT MOUNTED GEAR DRIVES
Filed May 14, 1969  2 Sheets-Sheet 2

INVENTOR
ALLYN E. PHILLIPS

BY

ATTORNEY

United States Patent Office 3,548,678
Patented Dec. 22, 1970

3,548,678
TORQUE ABSORBER FOR SHAFT MOUNTED GEAR DRIVES
Allyn E. Phillips, Brookfield, Wis., assignor to The Falk Corporation, Milwaukee, Wis., a corporation of Wisconsin
Filed May 14, 1969, Ser. No. 824,505
Int. Cl. C21c *5/50;* F16h *37/06, 57/00*
U.S. Cl. 74—665      7 Claims

ABSTRACT OF THE DISCLOSURE

A torque absorber and torque absorbing system for limiting rotation of a shaft mounted gear drive for heavy equipment, such as a basic oxygen steel making furnace, which includes a pair of spaced torque absorbers, one on each side of the gear drive, that contact the housing of the drive to restrain its rotation and wherein the torque absorbers are especially adapted so they will undergo only compression loading during such rotation-restricting condition.

BACKGROUND OF THE INVENTION

(1) Field

This invention relates to the technology of rotation-restraining systems for shaft mounted gear drives used on heavy apparatus.

(2) Prior art

A basic oxygen steel making furnace (BOF) is a heavy vessel weighing as much as two to four hundred tons when empty and several hundred tons more when loaded. The furnace must be slowly rotated when the steel making process is completed to pour out the molten steel, for which purpose the furnace is mounted on horizontal trunnion shafts. A gear drive is carried on one of the trunnion shafts to rotate the furnace and generally includes a housing mounted on the shaft with various motors and speed reducers attached to the housing to drive a bull gear enclosed in the housing and jointed to the trunnion shaft. Some type of structure must be provided to prevent rotation of the hosuing when the gear drive is operated to rotate the furnace, and two principal systems are shown in the prior art. Kron et al. U.S. Patent 3,151,502 discloses a pair of spaced vertical torque arms, one on each side of the housing, and each torque arm is coupled to the housing with a ball and socket joint. A different type of system is taught by Lakin et al. 3,207,002 which utilizes horizontal torque absorbing units that engage a vertical plate secure to the bottom of the housing.

The torque-restraining units, or torque arms, in either of the above systems are stationarily mounted on concrete foundations. Heavy stresses are imposed on the foundations because of the extreme weights and torques involved and the arrangements of both 3,151,502 and 3,207,002 impose stresses that concrete foundations are not particularly adapted to withstand. Specifically, the vertical torque arms of 3,151,502, because they are coupled to the housing of the gear drive, exert tensile stresses on the foundations on which the torque arms are mounted, and the horizontal torque arms 3,207,002 impose shear stresses on their foundations. With either construction, the foundation is subject to damage because of the high tensile or shear stresses, or the concrete foundation will have to be made extraordinarily heavy to withstand such loadings without failure.

This invention seeks to obviate the unusual loading of the torque arm foundations encountered by the above torque restraining designs.

SUMMARY OF THE INVENTION

I have now devised a torque absorber system for a heavy vessel such as a BOF furnace having a shaft mounted drive in which the torque absorbers are subjected only to compression loading when restraining rotation of the gear drive. My invention provides a pair of spaced torque absorbers, one on each side of the gear drive, that have vertically reciprocable members which contact the drive housing and in which all loading on the torque absorber is in a vertically downward direction. Since concrete is strongest when in compression, this results in there being substantially less danger of damaging the foundations, and the foundations can be of lighter construction than necessary with the prior art apparatus, leading to important cost savings. An added benefit is that the loads on the furnace trunnion shaft bearings are reduced because all torque forces on such bearings are in a vertically upward direction.

A principal object of this invention is to provide rotation-restraining torque absorbers for shaft mounted gear drives for heavy apparatus that will not be subjected to tensile or shear loading when restraining rotation of the drive; another principal object is to provide torque absorber arrangements for the foregoing use in which the torque absorbers are subjected only to compression loading; a more specific object is to provide the particular improved torque absorber constructions hereinafter described and claimed.

DESCRIPTION OF THE DRAWINGS

A presently-preferred embodiment of this invention is shown in the accompanying drawings and discussed in concise and exact terms to explain its construction and use to those skilled in the art to which it pertains, which drawings and disclosure are meant to illustrate, not limit, the present invention inasmuch as it is anticipated that changes can be made in the illustrated embodiment that will remain within the true spirit and scope of this invention. In the drawings:

FIG. 1 is a front view, with portions broken away, of a shaft mounted gear drive for a basic oxygen steel making furnace and incorporating the torque absorbers of this invention;

FIG. 3 is a front view, with a portion broken away, showing the structural details of a torque absorber of this invention; and FIG. 4 is a horizontal sectional view of the torque absorber of FIG. 3 illustrating further its internal construction.

DESCRIPTION OF THE PREFERRED EMBODIMENTS

(1) General description

Figure 2:
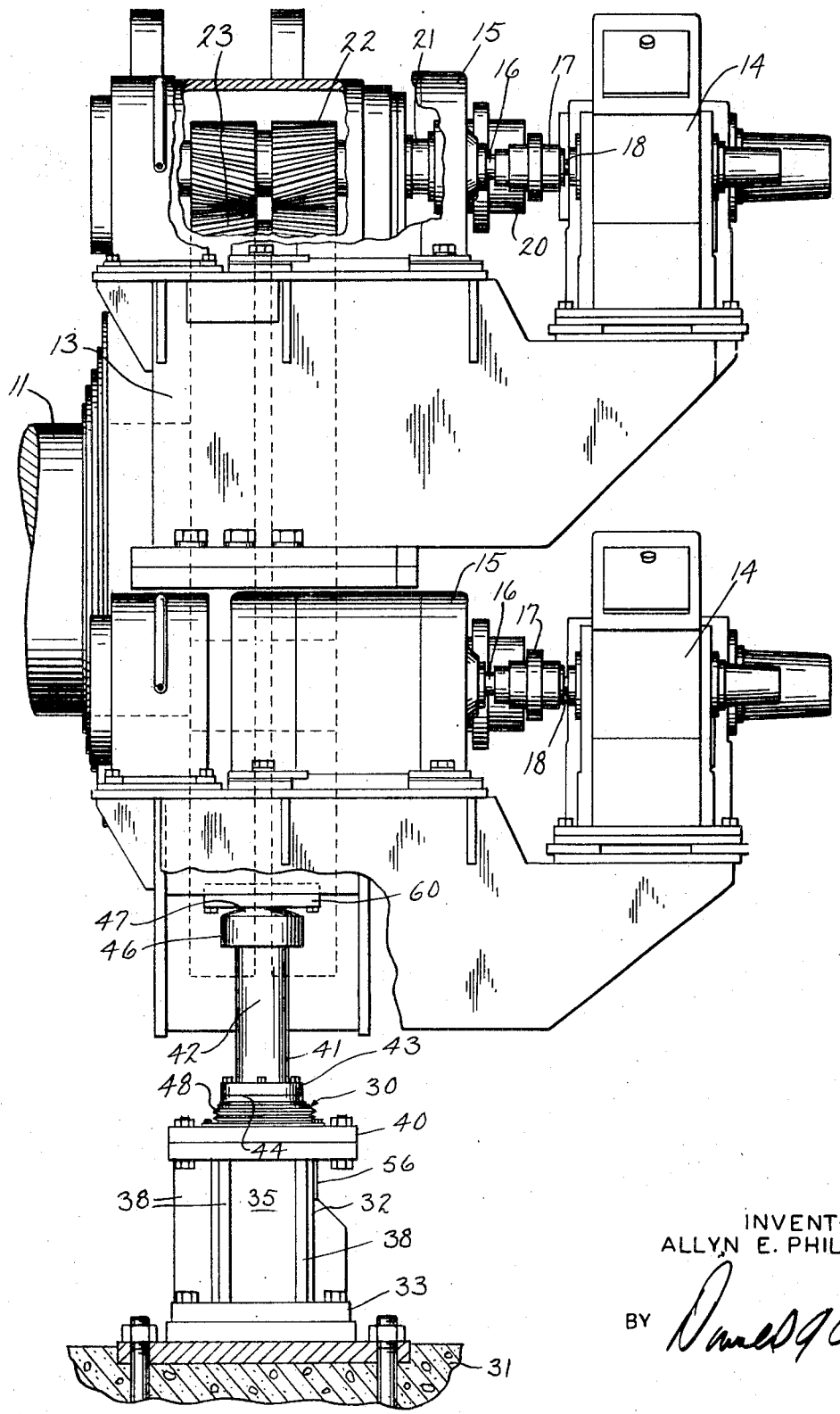
FIG. 2 is a side view, with portions broken away, further illustrating the torque absorbers employed with the drive of the furnace of FIG. 1.

FIG. 1 illustrates a basic oxygen furnace 10 as used in steel making having a trunnion shaft 11 projecting from one of its sides. A second trunnion shaft not visible in the drawings extends from the opposite side of the furnace and each trunnion shaft is supported in a suitable trunnion pedestal, also not visible in the drawings. The trunnion shafts define a horizontal axis about which the furnace can be tilted to permit loading with raw material and pouring of molten steel upon completion of the steel making operation. In order to rotate the furnace for the loading and unloading operations, a gear drive indicated generally by the reference numeral 12 is mounted on the trunnion shaft 11. The gear drive 12 includes a housing 13 that is usually formed of several parts joined together. Four speed reducers 14 are mounted on the housing and an electric motor 15 drives each speed reducer. As best shown in FIG. 2, the output shaft 16 of a motor is connected through a coupling 17 to the input shaft 18 of each speed reducer. Since the furnace is to operate at a very slow speed of rotation, often only 1 r.p.m., substantial speed reduction is required between the motor and the bull gear. The first stage is accomplished with the speed reducers 14, which may have as many stages of reduction as are desired for the particular installation. The output shaft 19 of each speed reducer is connected through a coupling 20 to a low speed pinion shaft 21 which carries a low speed pinion 22 that is enclosed within the housing 13. Each low speed pinion 22 meshes with the large bull gear 23 that is mounted on the trunnion shaft 11.

The furnace and its associated gear drive unit as described to this point are typical units and do not form a part of the present invention but they have been described in order to illustrate a field of use for this invention, it being borne in mind that this invention may be employed with shaft mounted gear drives used with other types of heavy apparatus such as mixers, grinding mills, crushers, etc.

(2) Torque absorber structure

A pair of torque absorbers 30 constructed in accordance with this invention are positioned, see FIG. 1, on each side of the gear drive 12. Each torque absorber 30 is securely fastened to a foundation 31 of concrete construction.

The details of the structure of each torque absorber 30 are best illustrated in FIGS. 3 and 4. A torque absorber 30 includes a housing 32 of rectangular configuration secured to a base plate 33, the housing including side walls 34, 35, 36 and 37 from which project a plurality of stiffening ribs 38. A cover 40 is fastened across the top of the housing 32 and has a central aperture through which extends a reciprocable piston 41. The piston is formed of two parts, an upper part 42 having a flange 43 in its lower end that is bolted to the lower part 44. The lower part 44 of the piston extends into the housing 32 and has a rectangular pressure plate 45 connected to its lower end, which plate 45 is of the same general configuration of the interior of the housing 52 with a suitable allowance for clearance as indicated in FIG. 4. A cap 46 with a spherical head 47 is conneted to the top of the piston 41.

A flexible rubber boot 48 extends around the lower part 44 of the piston 41 where it passes through the cover 40 of the housing in order to seal out dirt and moisture. The rubber boot 48 is bellows-shaped as indicated in the drawings to accommodate vertical movement of the piston 41 relative to the housing.

The pressure plate 45 of the piston 41 rests upon two stacks of resilient rubber cushions 50. The rubber cushions 50 are generally rectangular in shape with chamfered inner corners 50a (see FIG. 4) and may be made of any suitable abrasion resistant rubber material, natural or synthetic. The cushions 50 are resilient and compressible in order to absorb the loadings imposed thereon during actuation of the gear drive, as will be explained in greater detail below. While rubber cushions are specifically described, other resilient means such as springs, hydraulic cylinders, etc., can be used.

It is desirable to pre-stress the rubber cushions before the torque absorbers are installed, for which purpose the housing 32 includes vertical apertures 55 that are formed in the side wall 36 of the housing, there being one pre-stressing aperture 55 for each stack of cushions. A spacer member, such has a flat steel bar can be inserted through the apertures 55 to be wedged between the upper surface of the pressure plate 45 and the inner surface of the cover 40, to thereby apply the desired pre-stressing load to the cushions 50. The apertures 55 should be made as long as is necessary to apply the desired degree of pre-stressing or pre-load. A cover plate 56 protects against entry of dirt and moisture through the pre-loading apertures 55.

As best seen in FIG. 4, the inner surface of the walls 34 and 36 have a pair of spaced vertical guides 51 which extend upwardly as high as each stack of cushions and serve to prevent them from tilting or otherwise coming out of position. The pressure plate 45 attached to the lower end of the piston 41 which rests upon the top of the two stacks of cushions is cut out as at 52 that it will not contact the guides 51 as it reciprocates within the housing; also, the lower part 44 of the piston is flattened as indicated at 52 in FIGS. 3 and 4 to clear the guides 51.

(3) Installation and operation

As best illustrated in FIG. 1, the torque absorbers 30 are installed so as to contact the housing 13 of the gear drive 12 along opposite sides thereof. Each torque absorber is arranged with the spherical head 47 of its cap member 46 contacting a wear plate 60 secured to the housing 13. The torque absorbers are installed under a pre-stressed load as described above, and include steel bars in the slots 55 to retain such load; after being installed in such condition, furnace torque is utilized to loosen the bars so they can be removed by hand. The use of the wear plates 60 has the advantage that the torque absorbers do not rub directly on the housing and it can be readily replaced in the event of serious wear. Further, the torque absorber piston 41 with its two-part construction consisting of upper section 42 and lower section 44 is designed to facilitate replacement inasmuch as the upper section 42 can be removed without disturbing the main body of the torque absorber in event it is necessary to replace a cap member 46; additionally, such removal enables access to the replaceable wear plate 60 on the drive housing. Another advantage is that a torque absorber 30 can be removed from its foundation without disturbing the drive or other elements associated with the furnace in event of damage or other required change. Thus the particular structure of the torque absorber 30 illustrated herein is especially adapted for efficient operation in the type of heavy duty end use under consideration.

When the gear drive 12 is operated to drive the trunnion shaft 11 in a clockwise direction as indicated by the arrow in FIG. 1, the reaction torque forces developed by the drive will produce a resultant force that acts in a counter-clockwise direction on the housing. This reaction torque, in turn, will be imposed upon the left-hand torque absorber 30 shown in FIG. 1 and will move its piston 41 downward to compress the rubber cushions 50 enclosed within its housing. At the same time there may be a slight vertically upward movement of the piston 41 of the right-hand torque absorber 30. Conversely, if the drive is operated to rotate the trunnion shaft in a counter-clockwise direction, or opposite the arrow shown in FIG. 1, the reaction torque forces will be exerted as a compression loading on the right-hand torque absorber 30 causing its piston 41 to move downward and compress the cushions 50; this may be combined with a slight upward movement of the piston of the left-hand torque absorber. In either instance, however, only compression loading will be exerted upon the foundations 31 on which each torque absorber rests. This is in distinction to the prior art devices described previously in which the reaction torque forces against the gear drive housing exert tensile loading and/or shear loading on the reaction torque arms and their foundations. An added advantage is that the torque forces exerted on the bearings or the trunnion shaft 11 will be in a vertical upward direction so that the load on the bearings will be thereby reduced.

The torque absorbers 30 of this invention are also constructed to allow horizontal run-out or slight axial movement of the gear drive housing 13. This is accomplished by provision of the spherical headed cap 46 carried on the piston 41 of the torque absorber and the use of the rubber cushions 50. Horizontal run-out will be exhibited as a rolling action on the spherical cap 46 and a rocking action against the stacks of rubber cushions 50.

There has thus been described a torque absorber for shaft mounted gear drives having speed reduction gearing, particularly gear drives employed for the rotation of heavy apparatus, which is adapted to restrain the rotation of the gear drive in such fashion as to impose a compression load only on its foundation, or other means to which the torque absorber is attached, as a result of the reaction torque forces developed during rotation of the gear drive. Towards this end, the torque absorber of this invention includes a vertically reciprocable element and resilient cushioning means, the reciprocable element being adapted to contact the gear drive at its upper end and contact the resilient cushioning means at its lower end. Further, the upper end of the reciprocable element which is to contact the housing of the drive is in an abutting or a sliding abutting relationship only therewith; this phrase is defined to mean that there is to be no mechanical connection between the upper end of the reciprocable element of the torque absorber but only a surface-to-surface contact between the upper end of the torque absorber reciprocable element and the housing of the gear drive. A spherical cap member is shown as a preferred construction for the upper end of the reciprocable torque absorber element which is to contact the housing. Particularly effective structures for various elements of the torque absorber of this invention have been described herein, together with other elements which may be usefully combined with the basic torque absorber structure to further enhance its utility.

I claim:
1. In combination with (1) a heavy apparatus having a shaft about which the apparatus is rotated, (2) a gear drive mounted on the shaft for rotating the apparatus, the gear drive including a housing mounted on the shaft and speed reduction gearing within the housing, (3) a pair of torque absorbers for restricting rotation of the housing during rotation of the gear drive, there being one torque absorber located on each side of the housing, and (4) a foundation to which each torque absorber is attached, the improvement wherein: each said torque absorber includes a vertically reciprocable member and resilient means, said vertically reciprocable member having an upper end in abutting contact only with the housing and a lower end in contact with said resilient means, said vertical reciprocable member of each torque absorber being adapted to reciprocate in a vertical direction upon the imposition of torque forces on the housing during operation of the gear drive and thereby impose only compressive loading on its foundation.

2. Apparatus according to claim 1, wherein: the vertically reciprocable member of each torque absorber further includes a spherical cap connected to its upper end, which cap is in sliding abutting contact with the housing of the gear drive.

3. Apparatus according to claim 1, wherein: each torque absorber includes a torque absorber housing, the resilient means are positioned in the torque absorber housing, the vertically reciprocable member has its lower end inside and its upper end outside the torque absorber housing, and the vertically reciprocable member is formed of two portions which are connected together outside the torque absorber housing.

4. A torque absorber comprising in combination:
   (1) a housing,
   (2) resilient cushioning means disposed within the housing,
   (3) a vertical piston member arranged with its lower end within the housing for contact with the resilient cushioning means therein and with its upper end outside of the housing, the torque absorber being adapted for installation with rotatable apparatus wherein the upper end of the piston is to contact the apparatus in an abutting relationship only and wherein torque forces generated by said apparatus are imposed as compressive loading on the resilient cushioning means inside the housing of the torque absorber.

5. A torque absorbing unit according to claim 4, wherein: the vertical piston member is formed of two portions, and said two portions are joined together outside the housing of the torque absorber.

6. A torque absorber according to claim 4, further including: a spherical cap attached to the upper end of the vertical piston member, said spherical cap adapted for abutting contact with apparatus to which the torque absorber is to be installed.

7. A torque absorber according to claim 4, further including: a pre-stressing slot formed in the housing and positioned for the insertion of means for compressing the resilient cushioning means therein to apply a pre-stressed loading to the cushioning means.

References Cited

UNITED STATES PATENTS 3,400,922   9/1968   Langlitz _____ 266—36P

LEONARD H. GERIN, Primary Examiner

U.S. Cl. X.R.
74—410; 266—36